(12) United States Patent
Michalewich et al.

(10) Patent No.: US 12,515,107 B2
(45) Date of Patent: Jan. 6, 2026

(54) MULTI-LAYER GOLF BALLS WITH IN-SITU ADHESION PROMOTER

(71) Applicant: Acushnet Company, Fairhaven, MA (US)

(72) Inventors: Michael Michalewich, Norton, MA (US); Shawn Ricci, New Bedford, MA (US)

(73) Assignee: Acushnet Company, Fairhaven, MA (US)

( * ) Notice: Subject to any disclaimer, the term of this patent is extended or adjusted under 35 U.S.C. 154(b) by 111 days.

(21) Appl. No.: 18/509,876

(22) Filed: Nov. 15, 2023

(65) Prior Publication Data

US 2025/0153008 A1 May 15, 2025

(51) Int. Cl.
*A63B 37/06* (2006.01)
*A63B 37/00* (2006.01)

(52) U.S. Cl.
CPC ...... *A63B 37/0039* (2013.01); *A63B 37/0027* (2013.01)

(58) Field of Classification Search
CPC ............ A63B 37/0023; A63B 37/0027; A63B 37/0039
See application file for complete search history.

(56) References Cited

U.S. PATENT DOCUMENTS

| | | |
|---|---|---|
| 4,968,752 A | 11/1990 | Kawamoto et al. |
| 5,091,478 A | 2/1992 | Saltman |
| 5,155,157 A | 10/1992 | Statz et al. |
| 5,300,325 A | 4/1994 | Nealon et al. |
| 5,459,220 A | 10/1995 | Kennedy |
| 5,494,291 A | 2/1996 | Kennedy |
| 5,817,735 A | 10/1998 | Hatch et al. |
| 5,820,491 A | 10/1998 | Hatch et al. |
| 6,018,012 A | 1/2000 | Crast et al. |
| 6,255,382 B1 | 7/2001 | Hamada et al. |
| 6,340,503 B1 | 1/2002 | Simonds et al. |
| 6,365,679 B1 | 4/2002 | Crast et al. |
| 6,395,861 B1 | 5/2002 | Kennedy, III |
| 6,425,831 B1 | 7/2002 | Heene et al. |
| 6,677,401 B2 | 1/2004 | Boehm et al. |
| 6,756,436 B2 | 6/2004 | Rajagopalan et al. |
| 6,992,135 B2 | 1/2006 | Boehm et al. |

(Continued)

*Primary Examiner* — Raeann Gorden
(74) *Attorney, Agent, or Firm* — Bradley Arant Boult Cummings LLP (57) ABSTRACT

Casing compositions including carboxyl groups, cover compositions including nucleophile groups and an adhesion promoter capable of crosslinking carboxyl and nucleophile groups, and golf balls made from such compositions that have crosslinks between carboxyl groups in the casing composition and nucleophile groups in the cover composition. The nucleophile groups may be hydroxyl groups, amino groups, or other types of nucleophile groups. The adhesion promoter may be a polyaziridine. An acid catalyst may be used to facilitate the reaction between the nucleophile groups in the cover composition and the adhesion promoter. The type and concentration of the components in the casing and cover compositions, including the adhesion promoter, affect the adhesion between golf balls having components made from such compositions and, thus, can be used to produce a golf ball having increased durability.

20 Claims, 3 Drawing Sheets

(56) References Cited

U.S. PATENT DOCUMENTS

| | | |
|---|---|---|
| 8,475,881 B1 | 7/2013 | Melanson et al. |
| 2001/0031672 A1 | 10/2001 | Cao et al. |
| 2002/0016226 A1 | 2/2002 | Jin et al. |
| 2002/0028857 A1 | 3/2002 | Holy |
| 2002/0032289 A1 | 3/2002 | Wang et al. |
| 2002/0151383 A1 | 10/2002 | Crast et al. |
| 2002/0173384 A1 | 11/2002 | Hogge et al. |
| 2003/0050425 A1 | 3/2003 | Kennedy, III et al. |
| 2004/0068059 A1 | 4/2004 | Katayama et al. |
| 2004/0220356 A1 | 11/2004 | Wu et al. |
| 2004/0220357 A1 | 11/2004 | Wu et al. |
| 2004/0220371 A1 | 11/2004 | Wu |
| 2004/0220373 A1 | 11/2004 | Wu et al. |
| 2004/0220375 A1 | 11/2004 | Wu |
| 2004/0220376 A1 | 11/2004 | Kuntimaddi et al. |
| 2004/0220377 A1 | 11/2004 | Kuntimaddi et al. |
| 2004/0220378 A1 | 11/2004 | Kuntimaddi et al. |
| 2004/0254032 A1 | 12/2004 | Lutz et al. |
| 2005/0004325 A1 | 1/2005 | Wu et al. |
| 2005/0119451 A1 | 6/2005 | Wu et al. |
| 2005/0197481 A1 | 9/2005 | Temple et al. |
| 2005/0202188 A1 | 9/2005 | Aono et al. |
| 2005/0271881 A1 | 12/2005 | Hong |
| 2005/0272529 A1 | 12/2005 | Wu |
| 2005/0272530 A1 | 12/2005 | Wu |
| 2005/0272899 A1 | 12/2005 | Wu |
| 2005/0272900 A1 | 12/2005 | Kuntimaddi et al. |
| 2005/0272909 A1 | 12/2005 | Kuntimaddi et al. |
| 2005/0282661 A1 | 12/2005 | Fujisawa et al. |
| 2006/0088721 A1 | 4/2006 | Mayo et al. |
| 2006/0089419 A1 | 4/2006 | Hogge et al. |
| 2007/0093317 A1 | 4/2007 | Wu et al. |
| 2007/0173348 A1 | 7/2007 | Rajagopalan et al. |
| 2007/0207335 A1 | 9/2007 | Karandikar et al. |
| 2008/0014236 A1 | 1/2008 | Pacetti et al. |
| 2008/0271344 A1 | 11/2008 | Skirrow |
| 2010/0087273 A1 | 4/2010 | Matthews |
| 2010/0234485 A1 | 9/2010 | Kohli Steck et al. |
| 2011/0137006 A1 | 6/2011 | McGuire, Jr. et al. |
| 2011/0244983 A1 | 10/2011 | Shen et al. |
| 2012/0004338 A1 | 1/2012 | Hywel-Evans |
| 2012/0095169 A1 | 4/2012 | Ogawa et al. |
| 2013/0315972 A1 | 11/2013 | Krasnow et al. |
| 2014/0187352 A1 | 7/2014 | Kim et al. |
| 2014/0271757 A1 | 9/2014 | Agrawal et al. |
| 2015/0368512 A1 | 12/2015 | Bowman et al. |
| 2016/0032180 A1 | 2/2016 | Agrawal et al. |
| 2016/0122327 A1 | 5/2016 | Winter et al. |
| 2016/0145202 A1 | 5/2016 | Winter et al. |
| 2016/0145219 A1 | 5/2016 | Winter et al. |
| 2016/0166885 A1 | 6/2016 | Kim |
| 2016/0166886 A1 | 6/2016 | Binette et al. |
| 2016/0166888 A1 | 6/2016 | Kim |
| 2016/0251571 A1 | 9/2016 | Agrawal et al. |
| 2016/0279483 A1 | 9/2016 | Sullivan et al. |
| 2017/0065855 A1 | 3/2017 | Sullivan et al. |
| 2017/0136311 A1 | 5/2017 | Binette et al. |
| 2017/0233605 A1 | 8/2017 | Erdodi et al. |
| 2018/0057617 A1 | 3/2018 | Breon et al. |
| 2018/0282575 A1 | 10/2018 | Breon et al. |
| 2019/0002709 A1 | 1/2019 | Xu et al. |
| 2019/0038940 A1 | 2/2019 | Comeau et al. |
| 2019/0040378 A1 | 2/2019 | Fotin-Mleczek et al. |
| 2019/0040593 A1 | 2/2019 | Tetrault et al. |
| 2019/0083851 A1* | 3/2019 | Sullivan .................. A63B 1/00 |
| 2019/0083852 A1 | 3/2019 | Sullivan et al. |
| 2019/0083853 A1 | 3/2019 | Sullivan et al. |
| 2019/0083854 A1 | 3/2019 | Sullivan et al. |
| 2019/0083855 A1* | 3/2019 | Sullivan ............. C08G 18/6674 |
| 2019/0085200 A1 | 3/2019 | Jordan et al. |
| 2019/0085203 A1 | 3/2019 | Faler et al. |
| 2019/0144738 A1 | 5/2019 | Agrawal et al. |
| 2019/0217157 A1 | 7/2019 | Sullivan et al. |
| 2020/0040216 A1 | 2/2020 | Chasser et al. |
| 2020/0095461 A1 | 3/2020 | Lu et al. |
| 2020/0239730 A1 | 7/2020 | Martin et al. |
| 2020/0290086 A1 | 9/2020 | Xu et al. |
| 2020/0291255 A1 | 9/2020 | Martin et al. |
| 2020/0291263 A1 | 9/2020 | Martin et al. |
| 2021/0040262 A1 | 2/2021 | Breon et al. |
| 2021/0040350 A1 | 2/2021 | Swarup et al. |
| 2021/0079009 A1 | 3/2021 | Walters et al. |
| 2021/0115185 A1 | 4/2021 | MacDonald et al. |
| 2021/0129185 A1 | 5/2021 | Wang et al. |
| 2021/0187819 A1 | 6/2021 | Connell et al. |
| 2021/0246331 A1 | 8/2021 | Wang et al. |
| 2021/0321653 A1 | 10/2021 | Kubota |
| 2021/0388228 A1 | 12/2021 | Verardi et al. |
| 2021/0403745 A1 | 12/2021 | Wo et al. |
| 2022/0017767 A1 | 1/2022 | Jones et al. |
| 2022/0193501 A1 | 6/2022 | Shinohara et al. |
| 2022/0220335 A1 | 7/2022 | Reil et al. |
| 2022/0332973 A1 | 10/2022 | Swarup et al. |
| 2023/0001450 A1 | 1/2023 | Wang et al. |

* cited by examiner

MULTI-LAYER GOLF BALLS WITH IN-SITU ADHESION PROMOTER

FIELD OF THE INVENTION

The present disclosure relates generally to compositions for use in golf ball components that facilitate crosslinks between the components. The compositions of the present disclosure result in golf ball components with improved adhesion strength therebetween. In addition, the compositions of the present disclosure result in golf balls with better shear durability (as compared to conventional golf balls). More particularly, the present disclosure provides compositions and golf ball components made from such compositions that provide increased shear durability and increased adhesion strength between two or more layers of a golf ball when such components are used in a golf ball.

BACKGROUND OF THE INVENTION

The performance and/or durability of a golf ball is affected by a variety of factors including the materials, weight, size, dimple pattern, and external shape of the golf ball. As a result, golf ball manufacturers are constantly improving or tweaking the materials and construction of a ball in an effort to make incremental gains in performance without sacrificing durability.

In this aspect, one issue with the multi-piece golf balls commonly used in modern play is the lack of adhesion between layers of the golf ball. Adhesion strength is a direct measure of the adhesion between two or more layers of a golf ball. The adhesion strength between two layers can be measured as the force required to separate the two layers. Low adhesion strength between layers of a golf ball may result in the golf ball having low shear durability. Golf balls having a low shear durability may delaminate more frequently when exposed to a shear force. Delamination is the decoupling of an outer layer of the golf ball, such as the cover of the golf ball, from an adjacent inner layer, such as a casing layer. Delamination commonly occurs when a golf ball is struck with a high-angle club, such as a wedge, that imposes a strong shear force on the golf ball. As a result of the shear force, the outer and inner layers may move in different directions or at different speeds and decouple from each other. Delamination may be visibly apparent as "bubbling" or air pockets between layers or as cutting in the cover of the golf ball. Delamination detrimentally affects not only the appearance of the golf ball but the performance as well.

Modern multi-piece, solid golf balls often include a core, a casing layer disposed around the core, and a cover layer disposed around the casing layer. Casing layers and cover layers may be made of a variety of materials including ethylene acid copolymer ionomers, polyamides, polyesters, polyurethanes, and polyureas. In particular, cover layers are commonly cast from polyurethane. For example, popular three-piece golf balls may include a rubber core surrounded by an ionomer-based casing layer and a urethane-based cover layer.

Currently, several different types of adhesion-promoting pre-treatment processes exist for addressing cut and shear issues caused by lack of adhesion between casing and cover layers. Examples of pretreatments include surface roughening; surface energy modifications such as corona, plasma, and flame treatments; adhesives; adhesion promoters; and combinations thereof. Adhesives are typically applied via spray or dip and usually require a drying and post-cure step. Certain adhesion promoters may be applied by dip or spray, followed by rinsing and drying steps. For golf balls having a cast urethane cover disposed on a casing layer, the casing layer must be treated with primer to increase adhesion between the casing layer and cover and decrease the likelihood of delamination. These adhesion-promoting processes increase the adhesion strength between layers and the overall durability of the golf ball but require expensive materials and additional steps in the manufacturing process, which increases manufacturing time and cost.

Thus, it would be advantageous to have compositions for use in the casing and cover layers of golf balls that improve the durability of the golf ball while still providing desirable playing properties and without the need for additional materials or manufacturing steps. The present invention provides such compositions and golf balls including components made with such compositions.

SUMMARY OF THE INVENTION

The present invention relates to a golf ball including: a core; a casing layers disposed on the core, the casing layer formed from a composition including carboxyl groups; a cover disposed on the casing layer and formed from a cover composition including nucleophile groups and a polyaziridine adhesion promoter; and crosslinks between the carboxyl groups of the casing layer and the nucleophile groups of the cover layer. In some embodiments, the nucleophile groups include hydroxyl groups, and the crosslinks may include one or more of the following linkage:

wherein R1 is a carbon chain in the adhesion promoter, R2 is a carbon chain in the cover layer, and R3 is a carbon chain in the casing layer. In other embodiments, the nucleophile groups include amino groups, and the crosslinks include one or more of the following linkage:

and wherein R1 is a carbon chain in the adhesion promoter, R2 is a carbon chain in the cover layer, and R3 is a carbon chain in the casing layer.

The adhesion promoter may be included in the cover composition in an amount of about 0.01 to about 5.0 percent by weight. In some embodiments, the adhesion promoter includes a difunctional polyaziridine. In other embodiments, the adhesion promoter includes a trifunctional polyaziridine. In still other embodiments, the casing composition includes an ionomer. In yet other embodiments, the cover composition includes a base polymer that is selected from the group consisting of polyurethanes, polyureas, and hybrids, copolymers, and blends thereof. In further embodiments, the cover layer may include a catalyst. The catalyst may be an acid catalyst.

The invention further relates to a golf ball including a core; a casing layer disposed on the core, the casing layer formed from a casing composition including carboxyl groups; and a cover disposed on the casing layer and formed from a prepolymer and a curative blend, wherein the prepolymer is the reaction product of an isocyanate-containing component and an adhesion promoter, and the curative blend including a hydroxy-terminated or amine-terminated chain extender and a catalyst, wherein the adhesion promoter includes a polyaziridine.

The adhesion promoter may be included in the cover composition in an amount of about 0.01 percent to about 5.0 percent by weight. In some embodiments, the adhesion promoter is a difunctional polyaziridine. In other embodiments, the adhesion promoter is a difunctional polyaziridine. In yet other embodiments, the catalyst may be an acid catalyst. In still other embodiments, the base polymer is selected from the group consisting of polyurethanes, polyurethane-polyurea hybrids, polyurethane-polyurea copolymers, and polyurethane-polyurea blends.

The invention further relates to a golf ball including a core; a casing layer disposed on the core and formed from a casing composition including an ionomer; and a cover disposed on the casing layer and formed from a cover composition including a base polymer selected from the group consisting of polyurethanes, polyureas, polyurethane-polyurea hybrids, polyurethane-polyurea copolymers, and polyurethane-polyurea blends; and crosslinks between the cover and casing layer including one or more of the following linkages:

and wherein R1 is a carbon chain in the adhesion promoter, R2 is a carbon chain in the cover layer, and R3 is a carbon chain in the casing layer.

In some embodiments, the base polymer is selected from the group consisting of polyurethanes, polyurethane-polyurea hybrids, polyurethane-polyurea copolymers, and polyurethane-polyurea blends, and wherein the crosslinks include one or more of the following linkage:

and wherein R1 is a carbon chain in the adhesion promoter, R2 is a carbon chain in the cover layer, and R3 is a carbon chain in the casing layer.

In other embodiments, the base polymer is selected from the group consisting of polyurea, polyurethane-polyurea hybrids, polyurethane-polyurea copolymers, and polyurethane-polyurea blends, and wherein the crosslinks include one or more of the following linkage:

and wherein R1 is a carbon chain in the adhesion promoter, R2 is a carbon chain in the cover layer, and R3 is a carbon chain in the casing layer.

In still other embodiments, the base polymer is selected from the group consisting of polyurethane-polyurea hybrids, polyurethane-polyurea copolymers, and polyurethane-poly-urea blends, and wherein the crosslinks include one or more of each of the following linkage.

and wherein R1 is a carbon chain in the adhesion promoter, R2 is a carbon chain in the cover layer, and R3 is a carbon chain in the casing layer.

BRIEF DESCRIPTION OF THE DRAWINGS

Further features and advantages of the invention can be ascertained from the following detailed description that is provided in connection with the drawings described below.

DETAILED DESCRIPTION OF THE INVENTION

The present disclosure relates to compositions that may be used to produce multi-layer golf balls. More specifically, the casing and cover compositions of the present disclosure may be used to form a casing layer and a cover layer of a golf ball. The compositions described herein may result in golf balls with improved shear durability and increased adhesion between layers (as compared to golf balls that do not include the components formed from compositions of the present disclosure). The casing and cover compositions and the components and golf balls formed therefrom are discussed in more detail below.

Casing Composition

Golf balls of the present disclosure may also include a casing layer disposed between the core and the cover layer. The casing layer may also be referred to as an intermediate layer, mantle layer, inner cover layer, or any other layer disposed between the core assemblage and the outer cover of the ball. As discussed in more detail below, one or more layers of the casing may include a casing composition formed from an ionomer.

In this aspect, ionomers suitable for use in accordance with the present disclosure may include partially-neutralized ionomers and highly-neutralized ionomers (HNPs), including ionomers formed from blends of two or more partially-neutralized ionomers, blends of two or more highly-neutralized ionomers, and blends of one or more partially-neutralized ionomers with one or more highly-neutralized ionomers. For purposes of the present disclosure, "HNP" refers to an acid copolymer after at least 70 percent of all acid groups present in the composition are neutralized.

Preferred ionomers are salts of O/X- and O/X/Y-type acid copolymers, wherein O is an α-olefin, X is a C3-C8 α,β-ethylenically unsaturated carboxylic acid, and Y is a softening monomer. O is preferably selected from ethylene and propylene. X is preferably selected from methacrylic acid, acrylic acid, ethacrylic acid, crotonic acid, and itaconic acid. Methacrylic acid and acrylic acid are particularly preferred. Y is preferably selected from (meth) acrylate and alkyl (meth) acrylates wherein the alkyl groups have from 1 to 8 carbon atoms, including, but not limited to, n-butyl (meth) acrylate, isobutyl (meth) acrylate, methyl (meth) acrylate, and ethyl (meth) acrylate.

Preferred O/X and O/X/Y-type copolymers include, without limitation, ethylene acid copolymers, such as ethylene/(meth)acrylic acid, ethylene/(meth)acrylic acid/maleic anhydride, ethylene/(meth)acrylic acid/maleic acid monoester, ethylene/maleic acid, ethylene/maleic acid mono-ester, ethylene/(meth)acrylic acid/n-butyl (meth)acrylate, ethylene/(meth)acrylic acid/isobutyl (meth)acrylate, ethylene/(meth)acrylic acid/methyl (meth)acrylate, ethylene/(meth) acrylic acid/ethyl (meth)acrylate terpolymers, and the like. The term, "copolymer," as used herein, includes polymers having two types of monomers, those having three types of monomers, and those having more than three types of monomers. Preferred α, β-ethylenically unsaturated mono- or dicarboxylic acids are (meth) acrylic acid, ethacrylic acid, maleic acid, crotonic acid, fumaric acid, itaconic acid. (Meth) acrylic acid is most preferred. As used herein, "(meth) acrylic acid" means methacrylic acid and/or acrylic acid. Likewise, "(meth) acrylate" means methacrylate and/or acrylate.

In a particularly preferred version, highly neutralized E/X- and E/X/Y-type acid copolymers, wherein E is ethylene, X is a C3-C8 α, β-ethylenically unsaturated carboxylic acid, and Y is a softening monomer are used. X is preferably selected from methacrylic acid, acrylic acid, ethacrylic acid, crotonic acid, and itaconic acid. Methacrylic acid and acrylic acid are particularly preferred. Y is preferably an acrylate selected from alkyl acrylates and aryl acrylates and preferably selected from (meth) acrylate and alkyl (meth) acrylates wherein the alkyl groups have from 1 to 8 carbon atoms, including, but not limited to, n-butyl (meth) acrylate, isobutyl (meth) acrylate, methyl (meth) acrylate, and ethyl (meth) acrylate. Preferred E/X/Y-type copolymers are those wherein X is (meth) acrylic acid and/or Y is selected from (meth) acrylate, n-butyl (meth) acrylate, isobutyl (meth) acrylate, methyl (meth) acrylate, and ethyl (meth) acrylate. More preferred E/X/Y-type copolymers are ethylene/(meth) acrylic acid/n-butyl acrylate, ethylene/(meth) acrylic acid/methyl acrylate, and ethylene/(meth) acrylic acid/ethyl acrylate.

The amount of ethylene in the acid copolymer may be at least about 15 weight percent, at least about 25 weight percent, at least about 40 weight percent, or at least about 60 weight percent, based on the total weight of the copolymer. The amount of C3 to C8 α, β-ethylenically unsaturated mono- or dicarboxylic acid in the acid copolymer is typically from 1 weight percent to 35 weight percent, from 5 weight percent to 30 weight percent, from 5 weight percent to 25 weight percent, or from 10 weight percent to 20 weight percent, based on the total weight of the copolymer. The amount of optional softening comonomer in the acid copolymer may be from 0 weight percent to 50 weight percent, from 5 weight percent to 40 weight percent, from 10 weight percent to 35 weight percent, or from 20 weight percent to 30 weight percent, based on the total weight of the copolymer.

The various O/X, E/X, O/X/Y, and E/X/Y-type copolymers are at least partially neutralized with a cation source, optionally in the presence of a high molecular weight organic acid, such as those disclosed in U.S. Pat. No. 6,756,436, the entire disclosure of which is hereby incorporated herein by reference. The acid copolymer can be reacted with the optional high molecular weight organic acid and the cation source simultaneously, or before the addition of the cation source. Suitable cation sources include but are not limited to metal ion sources, such as compounds of alkali metals, alkaline earth metals, transition metals, and rare earth elements; ammonium salts and monoamine salts; and combinations thereof. Preferred cation sources are compounds of magnesium, sodium, potassium, cesium, calcium, barium, manganese, copper, zinc, lead, tin, aluminum, nickel, chromium, lithium, and rare earth metals. The amount of cation used in the composition is readily determined based on the desired level of neutralization. As discussed above, for HNP compositions, the acid groups are neutralized to 70 percent or greater, 70 to 100 percent, or 90 to 100 percent. In one embodiment, an excess amount of neutralizing agent, that is, an amount greater than the stoichiometric amount needed to neutralize the acid groups, may be used. That is, the acid groups may be neutralized to, for example, 100 percent or greater, 110 percent or greater, or 120 percent or greater. In other embodiments, partially-neutralized compositions are prepared, wherein 10 percent or greater, normally 30 percent or greater of the acid groups are neutralized. When aluminum is used as the cation source, it is preferably used at low levels with another cation such as zinc, sodium, or lithium, since aluminum has a dramatic effect on melt flow reduction and cannot be used alone at high levels. For example, aluminum is used to neutralize about 10 percent of the acid groups and sodium is added to neutralize an additional 90 percent of the acid groups.

"Low acid" and "high acid" ionomeric polymers, as well as blends of such ionomers, may be used. In general, low acid ionomers are considered to be those containing 16 weight percent or less of acid moieties, whereas high acid ionomers are considered to be those containing greater than 16 weight percent of acid moieties. In one embodiment, the inner cover layer is formed from a composition including a high acid ionomer. A suitable high acid ionomer is Surlyn® 8150 (Dow), which is a copolymer of ethylene and methacrylic acid, having an acid content of 19 weight percent, 45 percent neutralized with sodium. In another embodiment, the inner cover layer is formed from a composition including a high acid ionomer and a maleic anhydride-grafted non-ionomeric polymer. An example of a suitable maleic anhydride-grafted polymer is Fusabond® 525D (Dow), which is a maleic anhydride-grafted, metallocene-catalyzed ethylene-butene copolymer having about 0.9 weight percent maleic anhydride grafted onto the copolymer. Blends of high acid ionomers with maleic anhydride-grafted polymers are further disclosed, for example, in U.S. Pat. Nos. 6,992,135 and 6,677,401, the entire disclosures of which are hereby incorporated herein by reference.

In another embodiment, the inner cover layer is formed from a composition including a blend of an ionomer with a reactive polymer, such as an epoxy resin or an epoxy-group functional polymer. Examples of such an epoxy resin or an epoxy-group functional polymers include glycidyl (meth) acrylate polymers. Blends of ionomers with glycidyl (meth) acrylate polymers are further disclosed, for example, in U.S. Pat. Nos. 4,968,752; 5,155,157; and 5,091,478 the entire disclosures of which are hereby incorporated herein by reference.

The inner cover layer also may be formed from a composition including a 50/45/5 blend of Surlyn® 8940/Surlyn® 9150/Nucrel® 960. In this aspect, the composition may have a material hardness of from 80 to 85 Shore C. In another embodiment, the inner cover layer is formed from a composition including a 50/25/25 blend of Surlyn® 8940/

Surlyn® 9150/Surlyn® 9910, having a material hardness of about 85 to 95 Shore C. In yet another embodiment, the inner cover layer is formed from a composition including a 50/50 blend of Surlyn® 8940/Surlyn® 9150, having a material hardness of about 82 to 90 Shore C. A composition including a 50/50 blend of Surlyn® 8940 and Surlyn® 7940 also may be used.

While the casing composition may be formed of the materials provided in this section, the composition may also be formed of any suitable composition useful in forming casing layers provided that such composition includes functional groups that can react/crosslink with functional groups in the cover composition (as discussed in more detail below). In one embodiment, the casing composition includes one or more free carboxyl groups.

Cover Compositions

Golf balls of the present invention may have a single or multi-layered cover. As discussed in more detail below, one or more layers of the cover may be formed from a composition including a base polymer and one or more other components. Concentrations of components are in weight percent (wt %) unless otherwise indicated. As used herein, the term, "weight percent," also known as "percent by weight" or "wt %" is defined as the weight of a particular component present in a mixture, relative to the weight of the mixture as a whole. Mathematically, this can be expressed as the weight of an ingredient divided by the total weight of the mixture, multiplied by a factor of 100.

The base polymer of the cover may be formed from a polyurethane, polyurea, or hybrid of polyurethane and polyurea depending on the desired characteristics and performance of a golf ball having a cover including the base polymer. Generally, a polyurethane or polyurethane-polyurea composition used to form the outer cover layer includes urethane linkages formed by reacting an isocyanate group (—N=C=O) with a hydroxyl group (—OH). The polyurethane or polyurethane-polyurea composition may be produced by the reaction of an isocyanate-containing component and a hydroxy-terminated component. In some embodiments, the polyurethane or polyurethane-polyurea composition is produced by the reaction of a multi-functional isocyanate compound (NCO—R—NCO) with a long-chain polyol having terminal hydroxyl groups (OH—R'—OH) to form a polyurethane prepolymer in the presence of a catalyst and other additives, such as an adhesion promoter. To form a polyurethane composition, the chain length of the polyurethane prepolymer is extended by reacting it with short-chain diols (OH—R"—OH). To form a hybrid polyurethane-polyurea composition, the chain length of the polyurethane prepolymer is extended by reacting it with short-chain diamines (NH$_2$—R"—NH$_2$).

Similarly, a polyurea or polyurea-polyurethane composition used to form the outer cover layer includes urea linkages formed by reacting an isocyanate group (—N=C=O) with an amino group (—NH$_2$). The polyurea composition may be produced by the reaction of an isocyanate-containing component and an amine-terminated component. In some embodiments, the polyurea or polyurea-polyurethane composition is produced by the reaction of a multi-functional isocyanate compound (NCO—R—NCO) with a long-chain polyamine having terminal amino groups (NH$_2$—R'—NH$_2$) to form a polyurea prepolymer in the presence of a catalyst and other additives, such as an adhesion promoter. To form a polyurea composition, the chain length of the polyurea prepolymer is extended by reacting it with short-chain diamines (NH$_2$—R"—NH$_2$). To form a hybrid polyurea-polyurethane composition, the chain length of the polyurea prepolymer is extended by reacting it with short-chain diols (OH—R"—OH).

By the term, "prepolymer" as used herein, it is meant a polymer of relatively low to medium molecular weight that is normally the intermediate material between a monomer and final polymer, and which may be further polymerized by reacting with cross-linking agents or chain extenders. By the term, "isocyanate compound" as used herein, it is meant any aliphatic or aromatic isocyanate containing two or more isocyanate functional groups. The isocyanate compounds can be monomers or monomeric units because they can be polymerized to produce polymeric isocyanates containing two or more monomeric isocyanate repeating units. The isocyanate compound may have any suitable backbone chain structure including saturated or unsaturated, aliphatic or aromatic, and linear, branched, or cyclic. The term "isocyanate compound" may be used interchangeably with isocyanate-containing component.

Any suitable isocyanate compound can be used to form the polyurethane or polyurethane-polyurea compositions. Suitable isocyanate compounds include but are not limited to isophorone diisocyanate (IPDI); 1,6-hexamethylene diisocyanate (HDI); 1,4-cyclohexyl diisocyanate (CHDI); 4,4'-diisocyanatodicyclohexylmethane diisocyanate (H12MDI); 4,4'-methylene diphenyl diisocyanate (MDI); 2,4'-methylene diphenyl diisocyanate (MDI); 2,4-toluene diisocyanate (TDI); 2,6-toluene diisocyanate (TDI); trimethyl hexamethylene diisocyanate (TMDI); 3,3'-dimethyl-4,4'-biphenyl diisocyanate (TOD); p-phenylene diisocyanate (PPDI); dodecane diisocyanate (C12DI); m-tetramethylene xylene diisocyanate (TMXDI); 1,4-benzene diisocyanate; trans-cyclohexane-1,4-diisocyanate; 1,5-naphthalene diisocyanate (NDI); naphthalene 2,4-diisocyanate (NDI); 4,6-xylene diisocyanate (XDI); 1,4-Bis(isocyanatomethyl)cyclohexane; or mixtures thereof.

Suitable aromatic diisocyanates that may be used in accordance with the present disclosure include, for example, 2,4-toluene diisocyanate (TDI), 2,6-toluene diisocyanate (TDI), 4,4'-methylene diphenyl diisocyanate (MDI), 2,4'-methylene diphenyl diisocyanate (MDI), polymeric methylene diphenyl diisocyanate (PMDI), p-phenylene diisocyanate (PPDI), m-phenylene diisocyanate (PDI), 1,5-naphthalene diisocyanate (NDI), naphthalene 2,4-diisocyanate (NDI), p-xylene diisocyanate (XDI), and homopolymers and copolymers and blends thereof.

Suitable aliphatic diisocyanates that may be used in accordance with this invention include, for example, isophorone diisocyanate (IPDI), 1,6-hexamethylene diisocyanate (HDI), dicyclohexylmethane-4,4'-diisocyanate ("H12 MDI"), meta-tetramethylxylene diisocyanate (TMXDI), trans-cyclohexane diisocyanate (CHDI), 1,4-Bis(isocyantomethyl)cyclohexane (H6XDI), and homopolymers and copolymers and blends thereof. Examples of suitable aliphatic diisocyanates for use with the present disclosure include Desomdur® N-3400 and Desomdur® W, available from Covestro AG of Leverkusen, Germany.

The polyol may be any aliphatic or aromatic compound containing two or more hydroxyl functional groups. The term "polyol" may be used interchangeably with hydroxy-terminated component. Suitable polyols for use in accordance with the present disclosure include, but are not limited to, polyether polyols, hydroxy-terminated polybutadiene (including partially/fully hydrogenated derivatives), polyester polyols, polycaprolactone polyols, and polycarbonate polyols. In some embodiments, the polyol includes polyether polyol. Suitable polyether polyols include, but are not limited to, polytetramethylene ether glycol (PTMEG); polyethylene glycol (PEG); polyethylene propylene glycol; polyoxypropylene glycol; and mixtures thereof. In other embodiments, the polyol is a polyester polyol. Suitable polyester polyols include, but are not limited to, polyethylene adipate glycol; polybutylene adipate glycol; polyethylene propylene adipate glycol; o-phthalate-1,6-hexanediol; poly(hexamethylene adipate) glycol; and mixtures thereof. In still other embodiments, the polyol is a polycaprolactone polyol. Suitable polycaprolactone polyols include, but are not limited to, 1,6-hexanediol-initiated polycaprolactone, diethylene glycol-initiated polycaprolactone, trimethylol propane initiated polycaprolactone, neopentyl glycol initiated polycaprolactone, 1,4-butanediol-initiated polycaprolactone, and mixtures thereof. In yet other embodiments, the polyol is a polycarbonate polyol. Suitable polycarbonate polyols include, but are not limited to, polyphthalate carbonate; poly(hexamethylene carbonate) glycol; and mixtures thereof. In any of these embodiments, the hydrocarbon chain can have saturated or unsaturated bonds, or substituted or unsubstituted aromatic and cyclic groups. In one embodiment, the molecular weight of the polyol is from about 200 to about 4000. In a particular embodiment, the polyol is polytetramethylene ether glycol 2000.

The polyamine may be any aliphatic or aromatic compound containing two or more amino functional groups. The term "polyamine" may be used interchangeably with amine-terminated component. Suitable polyamines for use in accordance with the present disclosure include but are not limited to polytetramethylene ether diamines, polyoxypropylene diamines, poly(ethylene oxide capped oxypropylene) ether diamines, triethyleneglycoldiamines, propylene oxide-based triamines, trimethylolpropane-based triamines, glycerin-based triamines, and mixtures thereof. In one embodiment, the polyether amine has a molecular weight of about 1000 to about 3000.

To form the polyurethane or polyurea prepolymer, a hydroxy-terminated component or an amine-terminated component, respectively, is reacted with a stoichiometric excess of the isocyanate-containing component. The reaction produces an isocyanate-terminated prepolymer. As a result of the reaction between the isocyanate compound and polyol or polyamine compounds, there will be some unreacted NCO groups in the prepolymer. The prepolymer should have no greater than about 15% unreacted NCO groups based on the total weight of prepolymer. In some embodiments, the prepolymer has no greater than about 12% unreacted NCO groups. In other embodiments, the prepolymer has no greater than about 1% to about 8% NCO groups based on the total weight of the prepolymer. As the weight percent of unreacted isocyanate groups increases, the hardness of the composition also generally increases.

The resulting isocyanate-terminated prepolymer can be reacted with a curative blend that includes a chain extender (curing agent) to extend the chain length of the prepolymer and build up its molecular weight. The chain extender may be a single chain-extender or blend of chain-extenders. In general, thermoplastic polyurethane or polyurea compositions are typically formed by reacting the isocyanate blend and chain extender at a 1:1 stoichiometric ratio. Thermoset compositions, on the other hand, are cross-linked polymers and are typically produced from the reaction of the isocyanate blend and chain extender at normally about a 1.05:1 stoichiometric ratio.

Suitable chain extenders include nucleophile-terminated functional groups such as hydroxy-terminated curing agents, amine-terminated curing agents, and combinations thereof.

The hydroxy-terminated curing agents may be ethylene glycol; diethylene glycol; polyethylene glycol; propylene glycol; 2-methyl-1,3-propanediol; 2-methyl-1,4-butanediol; monoethanolamine; diethanolamine; triethanolamine; monoisopropanolamine; diisopropanolamine; dipropylene glycol; polypropylene glycol; 1,2-butanediol; 1,3-butanediol; 1,4-butanediol; 2,3-butanediol; 2,3-dimethyl-2,3-butanediol; trimethylolpropane; cyclohexyldimethylol; triisopropanolamine; N,N,N',N'-tetra-(2-hydroxypropyl)-ethylene diamine; diethylene glycol bis-(aminopropyl) ether; 1,5-pentanediol; 1,6-hexanediol; 1,3-bis-(2-hydroxyethoxy) cyclohexane; 1,4-cyclohexyldimethylol; 1,3-bis-[2-(2-hydroxyethoxy) ethoxy]cyclohexane; 1,3-bis-{2-[2-(2-hydroxyethoxy) ethoxy]ethoxy}cyclohexane; trimethylolpropane; polytetramethylene ether glycol (PTMEG), preferably having a molecular weight from about 250 to about 3900; and mixtures thereof. The amine-terminated curing agents may be unsaturated diamines such as 4,4'-diamino-diphenylmethane (i.e., 4,4'-methylene-dianiline or "MDA"), m-phenylenediamine, p-phenylenediamine, 1,2- or 1,4-bis(sec-butylamino)benzene, 3,5-diethyl-(2,4- or 2,6-) toluenediamine or "DETDA", 3,5-dimethylthio-(2,4- or 2,6-)toluenediamine, 3,5-diethylthio-(2,4- or 2,6-)toluenediamine, 3,3'-dimethyl-4,4'-diamino-diphenylmethane, 3,3'-diethyl-5,5'-dimethyl4,4'-diamino-diphenylmethane (i.e., 4,4'-methylene-bis(2-ethyl-6-methyl-benzeneamine)), 3,3'-dichloro-4,4'-diamino-diphenylmethane (i.e., 4,4'-methylene-bis(2-chloroaniline) or "MOCA"), 3,3',5,5'-tetraethyl-4,4'-diamino-diphenylmethane (i.e., 4,4'-methylene-bis(2,6-diethylaniline), 2,2'-dichloro-3,3',5,5'-tetraethyl-4,4'-diamino-diphenylmethane (i.e., 4,4'-methylene-bis(3-chloro-2,6-diethyleneaniline) or "MCDEA"), 3,3'-diethyl-5,5'-dichloro-4,4'-diamino-diphenylmethane, or "MDEA"), 3,3'-dichloro-2,2',6,6'-tetraethyl-4,4'-diamino-diphenylmethane, 3,3'-dichloro-4,4'-diamino-diphenylmethane, 4,4'-methylene-bis(2,3-dichloroaniline) (i.e., 2,2',3,3'-tetrachloro-4,4'-diamino-diphenylmethane or "MDCA"); and mixtures thereof. In some embodiments, the amine-terminated curing agent is Ethacure® 300 (dimethylthiotoluenediamine or a mixture of 2,6-diamino-3,5-dimethylthiotoluene and 2,4-diamino-3,5-dimethylthiotoluene). In other embodiments, the amine-terminated curing agents have a cyclic structure and a low molecular weight (e.g., about 250 or less).

When a polyurethane prepolymer is reacted with a hydroxy-terminated curing agent during the chain-extending step, the resulting polyurethane composition contains urethane linkages. When a polyurea prepolymer is reacted with an amine-terminated curing agent during the chain-extending step, the resulting polyurea composition contains urea linkages. On the other hand, when the polyurethane or polyurea prepolymer is reacted with an amine-terminated curing agent or hydroxy-terminated curing agent, respectively, the resulting composition contains urethane and urea linkages and may be referred to as a polyurethane-polyurea hybrid or composition. The concentration of urethane and urea linkages in the hybrid composition may vary. In general, the hybrid composition may contain a mixture of about 10 to 90 percent urethane and about 90 to 10 percent urea linkages.

In some embodiments, the base polymer may be included in the cover composition in an amount of about 90 to about 100 percent by weight. In one embodiment, the base polymer is included in the cover composition in an amount of about 90 percent to about 99.9 percent or about 92 percent to about 97 percent or about 90 percent to about 95 percent or about 93 percent to about 95 percent or about 90 percent to about 93 percent or about 92 percent to about 94 percent by weight base polymer. In another embodiment, the base polymer is included in the cover composition in an amount of about 95 percent to about 99.9 percent or about 96 percent to about 99 percent or about 95 percent to about 98 percent or about 97 percent to about 99 percent. In a further embodiment, the base polymer may be included in the cover composition in an amount of about 96 percent to about 99.9 percent or about 97 percent to about 99.9 percent or about 98 percent to about 99.9 percent or about 99 to about 99.9 percent or about 98 to about 99.5 percent or about 98 percent to about 99 percent or about 98.5 to about 99.5 percent base polymer. The cover composition of the present disclosure may include an adhesion promoter. The adhesion promoter may be a compound with functional groups capable of reacting with nucleophile functional groups, such as hydroxyl groups and amino groups, or isocyanate groups. The adhesion promoter may be included in the prepolymer blend. While the adhesion promoter may be capable of reacting with the hydroxy-terminated component or the amine-terminated component present in the prepolymer blend, the adhesion promoter may not react with the hydroxy-terminated component or the amine-terminated component at significant levels in the absence of a catalyst. Similarly, while the adhesion promoter may be capable of reacting with the isocyanate-containing component present in the prepolymer blend, the adhesion promoter may not react with the isocyanate-containing component at significant levels in the absence of heat. Accordingly, the hydroxy-terminated component or the amine-terminated component may react with the isocyanate-containing component without significant interference from the adhesion promoter when the adhesion promoter is included in the prepolymer. Nonetheless, in some embodiments, the adhesion promoter may be added to the prepolymer after the reaction between the hydroxy-terminated component or the amine-terminated component and the isocyanate-containing component forms the isocyanate-terminated prepolymer. Without being bound to any particular theory, adding the adhesion promoter to the prepolymer after the reaction between the hydroxy-terminated component or the amine-terminated component and the isocyanate-containing component forms the isocyanate-terminated prepolymer may reduce or prevent reactions between the polyaziridine and the hydroxy-terminated component, the amine-terminated component, and the isocyanate-containing compound and promote proper formation of the prepolymer.

Without being bound to any particular theory, the adhesion promoter may react with nucleophile functional groups such as the hydroxyl groups on a hydroxy-terminated chain extender or an amino group on an amine-terminated chain extender. The chain extender may also react with the isocyanate groups on an isocyanate-terminated prepolymer to integrate the adhesion promoter into the base polymer. To be clear though, the adhesion promoter does not hinder the chain extenders from extending the chain length of the prepolymer as some portion of the chain extenders will only react with the isocyanate groups of isocyanate prepolymer. Moreover, the adhesion promoter may be multi-functional, which allows the adhesion promoter to react with hydroxyl groups on two or more hydroxy-terminated chain extenders or with amino groups on two or more amine-terminated chain extenders. The two or more hydroxy-terminated chain extenders or amine-terminated chain extenders may in turn react with the isocyanate groups on the isocyanate-terminated prepolymer such that the adhesion promoter is integrated into the base polymer and acts as a quasi-chain extender. In some embodiments, the adhesion promoter may be trifunctional to still allow for cross-linking of the cover layer and casing layer when the adhesion promoter is a quasi-chain extender. In some embodiments, the isocyanate groups of the isocyanate prepolymer and the functional groups of the adhesion promoter (such as aziridine groups on a polyaziridine adhesion promoter, discussed below) may be in stoichiometric excess to the hydroxyl or amino groups of the chain extender in the curative blend. Without being bound to any particular theory, this may ensure that sufficient functional groups on the adhesion promoter are available for crosslinking with carboxyl groups in the casing layer.

The adhesion promoter may be a compound capable of reacting with functional groups in the casing layer and functional groups in the cover composition. For example, when the casing composition includes free carboxyl groups and the cover composition includes free hydroxyl groups and/or free amino groups, the adhesion promoter may react with both. Without being bound to any particular theory, the adhesion promoter may react with one or more hydroxyl or amino groups in the cover compositions and one or more carboxyl groups in the casing compositions to create cross-links between the casing layer and cover layer, as discussed below. The cross-linking of the casing and cover layer may increase the adhesion of the cover layer to the casing layer or other intermediate layers.

In some embodiments, the adhesion promoter may be a polyaziridine, which may also be referred to as a polyfunctional aziridine. Suitable polyaziridines for use in accordance with the present disclosure may vary in structure based on the desired characteristics of the golf ball. For example, suitable polyaziridines may be aromatic or aliphatic. Aliphatic polyaziridines may be linear, branched, or cyclical. Suitable polyaziridines may be difunctional (i.e., a polyaziridine having two aziridinyl groups) or trifunctional polyaziridines (i.e., a polyaziridine having three aziridinyl groups). Non-limiting examples of inorganic titanates for use in cover compositions of the present disclosure include Trimethylolpropane tris(2-methyl-1-aziridinepropionate); trimethylolpropane tri-[beta-(N-aziridinyl)-propionate; 2,2-bishydroxymethyl butanoltris[3-(1-aziridine) propionate]; di(2-propyleniminoethyl)sulfone; pentaeryhritol tris(3-(1-aziridinyl) propionate); or combinations thereof. In a particular embodiment, the adhesion promoter is Trimethylolpropane tris(2-methyl-1-aziridinepropionate), including, but not limited to Crosslinker® CX-100, commercially available from Koninklijke DSM N.V.

The adhesion promoter may be included in the cover composition in varying amounts depending on the desired characteristics of the golf ball. In some embodiments, the adhesion promoter may be included in the cover composition in a concentration of about 0.01 to about 5.0 percent by weight percent by weight. In one embodiment, the adhesion promoter is included in the cover composition in a concentration of about 0.05 percent to about 3.0 percent or about 0.05 percent to about 2.5 percent or about 0.05 percent to about 2.0 percent or about 0.05 percent to about 1.5 percent or about 0.1 to about 3.0 percent or about 0.1 percent to about 2.5 percent or about 0.1 percent to about 2.0 percent or about 0.1 percent to about 1.5 or about 0.1 percent to about 1.25 percent or about 0.125 percent to about 1.0 percent by weight adhesion promoter. In another embodiment, the adhesion promoter is included in the cover composition in a concentration of about 0.01 percent to about 1.0 percent or about 0.025 percent to about 1.0 percent or about 0.025 percent to about 0.5 percent or about 0.025 percent to about 0.25 percent or about 0.05 percent to about 0.2 percent or about 0.075 percent to about 0.175 percent or about 0.1 percent to about 0.15 percent or about 0.05 percent to about 0.125 percent or about 0.075 percent to about 0.125 percent or about 0.125 percent to about 0.175 percent by weight adhesion promoter. In still another embodiment, the adhesion promoter is included in the cover composition in a concentration of about 0.1 percent to about 0.5 percent or about 0.125 percent to about 0.5 percent or about 0.25 percent to about 0.75 percent or about 0.5 percent to about 1.0 percent or about 0.1 percent to about 0.25 percent or about 0.125 percent to about 0.25 percent or about 0.25 percent to about 0.5 percent or about 0.5 percent to about 0.75 percent or about 0.75 percent to about 1.0 or about 0.125 percent to about 0.75 percent by weight adhesion promoter.

In some embodiments, more than one type of adhesion promoter may be included in the cover composition, i.e., the cover composition may include a first adhesion promoter in a first adhesion promoter concentration and a second adhesion promoter in a second adhesion promoter concentration. In this aspect, the ratio of the first adhesion promoter concentration (in percent by weight) to the second adhesion promoter concentration (in percent by weight) may be about 20:1 to about 1:1. In some embodiments, the ratio of the first adhesion promoter concentration to the second adhesion promoter concentration may be about 20:1 to about 2:1 or about 15:1 to about 3:1 or about 15:1 to about 3:1 or about 12:1 to about 5:1 or about 10:1 to about 5:1. In other embodiments, the ratio of the first adhesion promoter concentration to the second adhesion promoter concentration may be about 15:1 to about 5:1 or about 15:1 to about 7:1 or about 15:1 to about 10:1 or about 15:1 to about 12:1 or about 13:1 to about 7:1 or about 10:1 to about 7:1. In further embodiments, the ratio of the first adhesion promoter concentration to the second adhesion promoter concentration may be about 10:1 to about 1:1 or about 7:1 to about 1:1 or about 5:1 to about 1:1 or about 5:1 to about 2:1 or about 7:1 to about 3:1 or about 5:1 to about 3:1.

The first and second adhesion promoters may both be polyaziridines. In some embodiments, the first and second adhesion promoters may be polyaziridines that are similar. For example, the first and second adhesion promoters may both be difunctional polyaziridines or trifunctional polyaziridines. In other embodiments, the first and second adhesion promoters may differ in nature. For example, the first adhesion promoter may be a difunctional polyaziridine and the second adhesion promoter may be a trifunctional polyaziridine.

The second adhesion promoter may also be a titanate. Suitable titanates for use in accordance with the present disclosure may vary in structure based on the desired characteristics of the golf ball. For example, suitable titanates may be inorganic or organic and may be aromatic or aliphatic in nature. Suitable titanates may also be mono reactive or dual reactive titanates. As used herein, mono reactive titanates are titanates having only alkoxy groups and no other types of reactive groups. In contrast, dual reactive titanates are titanates having at least one hydrolysable functional group (e.g., alkoxy or acetoxy functional groups) and at least one non-hydrolysable functional group. The at least one hydrolysable functional group may be able to react with hydroxyl groups in a mineral or polymer and liberate alcohols or acetic acids, for example. The non-hydrolysable functional group may be organic and may be reactive toward other compounds such as amines, epoxies, vinyls, methacrylates, etc.

Non-limiting examples of inorganic titanates for use in cover compositions of the present disclosure include aluminum titanate; barium titanate; barium tetratitanate; barium calcium titanate; barium strontium titanate; barium zirconium titanate; bismuth titanate; calcium copper titanate; calcium titanate; cesium titanate; cesium hexatitanate; cobalt titanate; copper titanate; dysprosium titanate; europium titanate; gadolinium titanate; hafnium titanate; iron titanate; lanthanum titanate; lead calcium titanate; lead lanthanum zirconium titanate; lead magnesium niobate/lead titanate; lead strontium titanate; lead titanate; lithium potassium titanate; lithium titanate; magnesium dititanate; magnesium potassium titanate; magnesium titanate; magnesium zinc titanate; manganese titanate; neodymium titanate; nickel titanate; potassium hexatitanate; potassium sodium titanate; potassium titanate; praseodymium titanate; samarium titanate; sodium bismuth titanate; sodium titanate; strontium titanate; yttrium titanate; zinc titanate; or combinations thereof.

Organic titanates may be monoalkyl titanates, dialkyl titanates, trialkyl titanates, tetraalkyl titanates, monoalkoxy titanates, and neoalkoxy titanates. Non-limiting examples of organic titanates for use in cover compositions of the present disclosure include ethyl titanate; n-butyl titanate, isopropyl titanate; 2-ethylhexyl titanate; butyl titanate; isopropyl butyl titanate; n-propyl titanate; i-propyl titanate; stearyl titanate; octylene glycol titanate; ethyl titanate; t-butyl titanate; isopropyl triisostearoyl titanate, isopropyl dimethacryl isostearoyl titanate, isopropyl tri(dodecyl)benzenesulfonyl titanate; neopentyl(diallyl)oxy, trineodecanoyl titanate; neopentyl(diallyl)oxy, tri(dodecyl)benzene-sulfonyl titanate; neopentyl(diallyl)oxy, tri(dioctyl)phosphato titanate; or combinations thereof.

In some embodiments, the adhesion promoter may be a silane. Suitable silanes for use in accordance with the present disclosure may vary in structure based on the desired characteristics of the golf ball. For example, suitable silanes may be aromatic or aliphatic in nature. Suitable silanes may also include organosilanes, which are silanes having Si—C bonds, or siloxanes. Suitable silanes may also be mono reactive or dual reactive silanes. As used herein, mono reactive silanes are organosilanes having only alkoxy silane groups and no other types of reactive groups. In contrast, dual reactive silanes are organosilanes having at least one hydrolysable functional group (e.g., alkoxy or acetoxy functional groups) and at least one non-hydrolysable functional group. The at least one hydrolysable functional group may be able to react with hydroxyl groups in a mineral or polymer and liberate alcohols or acetic acids, for example. The non-hydrolysable functional group may be organic and may be reactive toward other compounds such as amines, epoxies, vinyls, methacrylates, etc. Suitable silanes also include monopodal silanes, also referred to as "conventional" or "traditional" silanes, and dipodal silanes. Monopodal silanes are silanes having a hydrolysable group on only one end of the molecule (e.g., alkoxysilane). Dipodal silanes are silanes having hydrolysable groups on each end of the molecule (e.g., bis-alkoxysilane).

Non-limiting examples of silanes for use with the present invention include silane esters; vinyl silanes; methacryloxy silanes; epoxy silanes; sulfur silanes; amino silanes; ureido silanes; or a mixture thereof. Preferably, the silanes include silane esters, octyltriethoxysilane, methyltriethoxylsilane, methyltrimethoxysilane, nonionic silane dispersing agents; vinyl silanes, vinyltriethoxysilane, vinyltrimethoxysilane, vinyl-tris-(2-methoxyethoxy) silane, vinylmethyldimethoxysilane; methacryloxy silanes, γ-methacryloxypropyltrimethoxysilane; epoxy silanes, β-(3,4-epoxycyclohexyl) ethyltrimethoxysilane, γ-glycidoxypropyltrimethoxysilane; sulfur silanes, γ-mercaptopropyltrimethoxysilane proprietary polysulfidesilane, bis-(3-[triethoxisily]-propyl)-tetrasulfane; γ-aminopropyltriethoxysilane, aminoalkyl silicone solution, modified aminoorganosilanes, n-β-(aminoethyl)-γ-aminopropyltrimethoxysilane, modified aminoorganosilanes, modified aminosilanes, triaminofunctional silanes, bis-(γ-trimethoxysilylpropyl)amine, bis-(γ-triethoxysilylpropyl)amine, n-phenyl-γ-aminopropyltrimethoxysilane, organomodified polydimethylsiloxane, polyazamide silane, n-β-(aminoethyl)-γ-aminopropylmethyldimethoxysilane; ureido silanes, γ-ureidopropyltrialkoxysilane, γ-ureidopropyltrimethoxysilane; isocyanate silanes, γ-isocyanatopropyltriethoxysilane; or mixtures thereof.

The cover composition of the present disclosure may include a pigment dispersion. The pigment dispersion may be included in the curative blend. The pigment dispersion may include a pigment and a dispersing agent and may be in a carrier, such as a hydroxyl-terminated carrier resin, that is added to the curative blend. Examples of suitable pure pigments include but are not limited to copper pigment, a chromium pigment, an aluminum pigment, a manganese pigment, a gold pigment, an arsenic pigment, a bismuth pigment, a cerium pigment, an iron pigment, a titanium pigment, a tin pigment, a zinc pigment, a quinacridone pigment, a phthalocyanine pigment, a complex oxide pigment, an ultramarine violet pigment, a cobalt violet pigment, a manganese violet pigment, a dioxane violet pigment, a quinacridone violet pigment, a carbon black pigment, or combinations thereof. Examples of suitable dispersing agents include fatty acid based wetting agents such as BYK-W 961; titanate-based additives such as Tytan CP-317; phosphoric acid esters such as Chemphos TC-310S; or any other wetting and dispersing agent. Examples of commercially available pigment dispersions include, but are not limited to, Stan-Tone HCC Vinyl Paste Dispersions, available from Avient Corporation of Avon Lake, Ohio; and Alkyd Dispersion available from Penn Color Inc. of Doylestown, Pennsylvania. In other embodiment, the carrier of the pigment dispersion may be an unreactive plasticizer, and the pigment dispersion may be added to the prepolymer blend or the curative blend.

The pigment dispersion may be included in the cover composition in varying amounts depending on the desired characteristics of the golf ball. In some embodiments, the pigment dispersion may be included in the cover composition in a concentration of about 0.1 percent to about 10.0 percent by weight percent by weight. In one embodiment, the adhesion promoter is included in the cover composition in a concentration of about 0.1 percent to about 8.0 percent or about 0.01 percent to about 6.0 percent or about 0.01 percent to about 4.0 percent or about 2.0 percent to about 6.0 percent or about 4.0 percent to about 8.0 percent or about 6.0 percent to about 10.0 percent by weight adhesion promoter. In another embodiment, the adhesion promoter is included in the cover composition in a concentration of about 0.1 percent to about 2.0 percent or about 1.0 percent to about 3.0 percent or about 2.0 percent to about 4.0 percent or about 3.0 percent to about 5.0 percent or about 4.0 percent to about 6.0 percent or about 5.0 percent to about 7.0 percent or about 6.0 percent to about 8.0 percent or about 2.0 percent to about 3.0 percent or about 3.0 percent to about 4.0 percent or about 3.5 percent or about 4.5 percent to about 4.0 percent to about 5.0 percent or about 5.0 percent to about 6.0 percent or about 6.0 percent to about 7.0 percent or about 7.0 percent to about 8.0 percent by weight adhesion promoter.

The cover composition of the present disclosure may also include a catalyst. In some embodiments, the catalyst may initiate the reaction between or increase the rate of reaction between the prepolymer and the chain extender. For example, the catalyst may initiate or increase the rate of reaction between the isocyanate groups of the prepolymer and the hydroxyl groups or amino groups of the chain extender. The catalyst may be included in the curative blend to initiate the reaction between the isocyanate groups in the prepolymer and the hydroxyl groups or amino groups of the chain extender in the curative blend when the curative blend is added to the prepolymer. Suitable catalysts for initiating the reaction between or increasing the rate of reaction between the prepolymer and the chain extender for use with the present disclosure include weak acids, strong acids, organic acids, inorganic acids, and carboxylic acids. Examples of catalysts for use with the present disclosure include but are not limited to acetic acid, fluoric acids, phosphoric acids, sulfuric acids, sulfonic acids, organic sulfuric acids, toluenesulfonic acid, polystyrene sulfonate, and heteropoly acids.

In other embodiments, the catalyst may initiate the reaction between or increase the rate of reaction between the adhesion promoter and the chain extender. For example, the catalyst may increase the rate of reaction between the aziridinyl groups of a polyaziridine adhesion promoter and the hydroxyl or amino groups of the chain extender. The catalyst may be included in the curative blend to prevent initiating a reaction between or increasing the rate of reaction between the adhesion promoter and other components of the prepolymer. Suitable catalysts for initiating the reaction between or increasing the rate of reaction between the adhesion promoter and the chain extender for use with the present disclosure include but are not limited to triflates such as copper triflate or tin triflate.

In further embodiments, the catalyst may initiate the reaction between or increase the rate of reaction between the adhesion promoter and the casing layer. For example, the catalyst may increase the rate of reaction between the aziridinyl groups of a polyaziridine adhesion promoter and the hydroxyl or amino groups of the chain extender. The catalyst may be included in the curative blend or in the cover layer to prevent initiating undesirable side reactions with the adhesion promoter. Suitable catalyst for initiating the reaction between or increasing the rate of reaction between the adhesion promoter and the casing layer for use in accordance with the present disclosure include tertiary amines, such as 1,8-diazbicyclo[5.4.0]undec-7-ene (DBU), and triflates, such as indium triflate.

The catalyst may be included in the cover composition in varying amounts depending on the desired characteristics of the golf ball. In some embodiments, the catalyst may be included in the cover composition in a concentration of about 0.01 percent to about 1.0 percent by weight percent by weight. In one embodiment, the adhesion promoter is included in the cover composition in a concentration of about 0.01 percent to about 0.75 percent or about 0.01 percent to about 0.5 percent or about 0.01 percent to about 0.25 percent or about 0.01 percent to about 0.15 percent or about 0.025 to about 0.125 percent or about 0.05 percent to about 0.010 percent or about 0.06 percent to about 0.09 percent or about 0.07 percent to about 0.08 or about 0.075 percent by weight adhesion promoter. In another embodiment, the adhesion promoter is included in the cover composition in a concentration of about 0.01 percent to about 0.2 percent or about 0.02 to about 0.18 or about 0.03 to about 0.14 or about 0.06 to about 0.12 or about 0.01 percent to about 0.05 percent or about 0.02 percent to about 0.07 percent or about 0.05 percent to about 0.10 percent or about 0.07 percent to about 0.12 percent or about 0.1 percent to about 0.15 percent or about 0.12 percent to about 0.17 percent or about 0.15 percent to about 0.2 percent by weight adhesion promoter.

Crosslinking the Casing and Cover Layers

As briefly discussed above, the adhesion promoter facilitates crosslinking between carboxyl groups in the casing composition and nucleophile groups, such as hydroxyl groups or amino groups, in the cover composition. Without being bound to any particular theory, the crosslinking between the carboxyl groups and the nucleophile groups in the compositions used to form the casing and cover layers of the present disclosure helps to increase adhesion between the casing and cover layers (as compared to casing and cover layers made from conventional compositions).

In some embodiments, the adhesion promoter may be a polyaziridine adhesion promoter. A polyaziridine adhesion promoter may react with a hydroxyl group of the cover composition to form an N—C—C—O linkage or an amino group in the cover composition to form an N—C—C—N linkage. Similarly, a polyaziridine adhesion promoter may also react with a carboxyl group in the casing composition to form a N—C—C—O—C=O linkage. In some embodiments, a polyaziridine adhesion promoter may be bifunctional and may only react with one hydroxyl or amino group in the cover composition and one carboxyl group in the casing composition. In other embodiments, a polyaziridine adhesion promoter may be trifunctional. In such embodiments, the polyaziridine adhesion promoter may react with two hydroxyl or amino groups in the cover composition and one carboxyl group in the casing composition or one hydroxyl or amino group in the cover composition and two carboxyl groups in the casing composition. When a polyaziridine adhesion promoter reacts with a hydroxyl group in the cover composition and a carboxyl group in the casing composition, the casing layer and cover layer may be crosslinked by the following linkage:

where R1 is a carbon chain in the adhesion promoter, R2 is a carbon chain in the cover layer, and R3 is a carbon chain in the casing layer. As used herein, "carbon chain" is only intended to refer to a chain that is primarily carbon and does not exclude chains that contain other elements, including but not limited to oxygen, nitrogen, and sulfur (e.g., chains including ether, sulfide, secondary and tertiary amines, ester, thioester). When the polyaziridine adhesion promoter reacts with an amino group in the cover composition and a carboxyl group in the casing composition, the casing layer and cover layer may be crosslinked by the following linkage:

where R1 is a carbon chain of the adhesion promoter, R2 is a carbon chain in the cover layer, and R3 is a carbon chain in the casing layer. The above illustrations are only representative of the "backbone" of the crosslink and do not exclude the possibility that the crosslink shown may have side branches not shown. The number and type of side branches may depend on the type of adhesion promoter used.

Golf Balls

Golf balls formed in accordance with the present disclosure include at least a core, a casing layer, and a cover. Without being bound to any particular theory, since the casing and cover compositions of the disclosure layer promote adhesion between layers, golf balls made using the casing and cover compositions of the present disclosure may be more durable than conventional golf balls without any sacrifices in performance or processability. In some embodiments, golf balls formed in accordance with the present disclosure have a cover layer formed from a cover composition of the present disclosure and a casing layer formed from a casing composition of the present disclosure.

Figure 1:
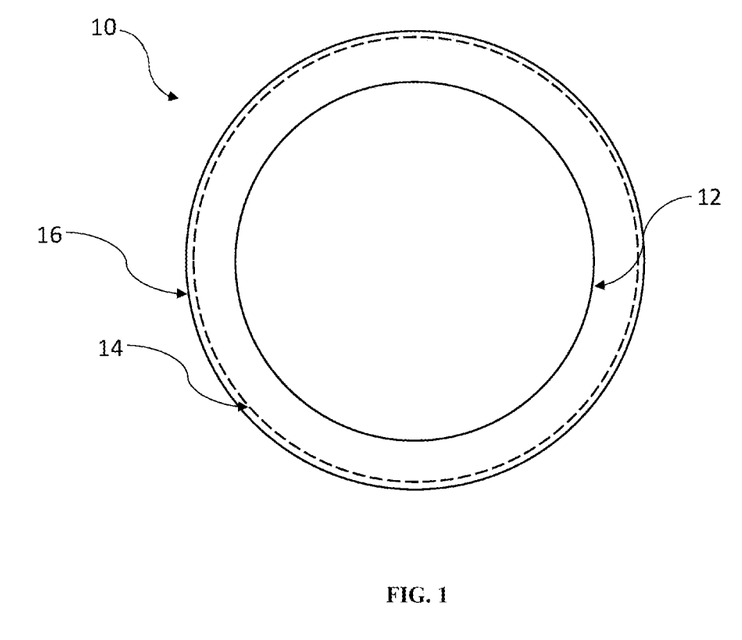
FIG. 1 is a cross-sectional view of a three-piece golf ball assemblage in accordance with an embodiment of the present disclosure.
Figure 2:
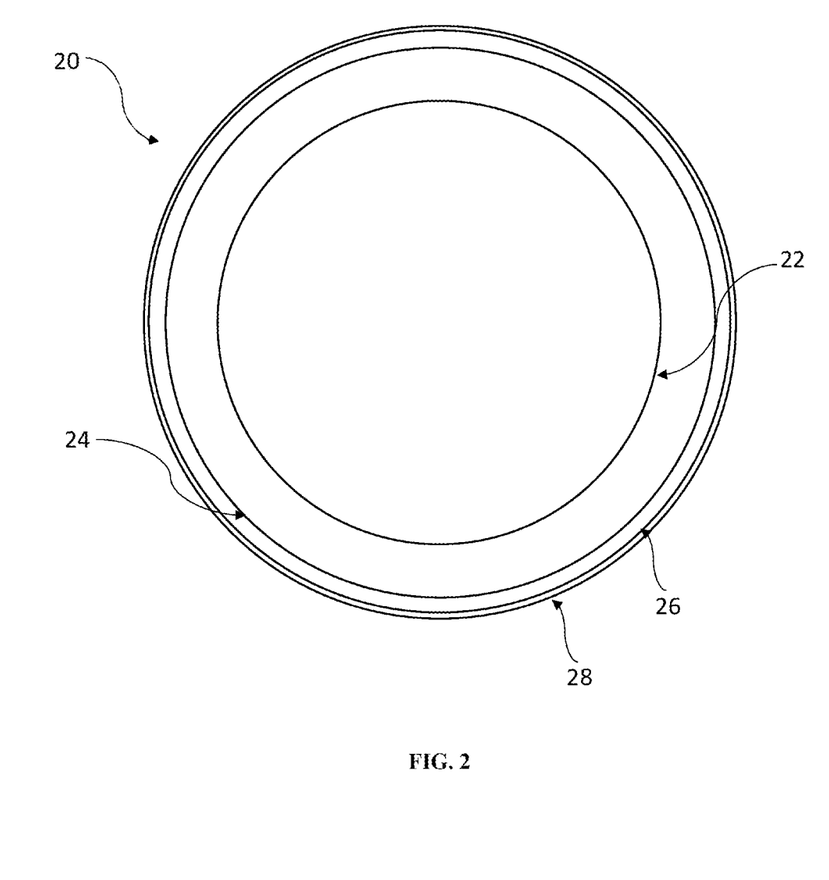
FIG. 2 is a cross-sectional view of a four-piece golf ball in accordance with an embodiment of the present disclosure.
Figure 3:
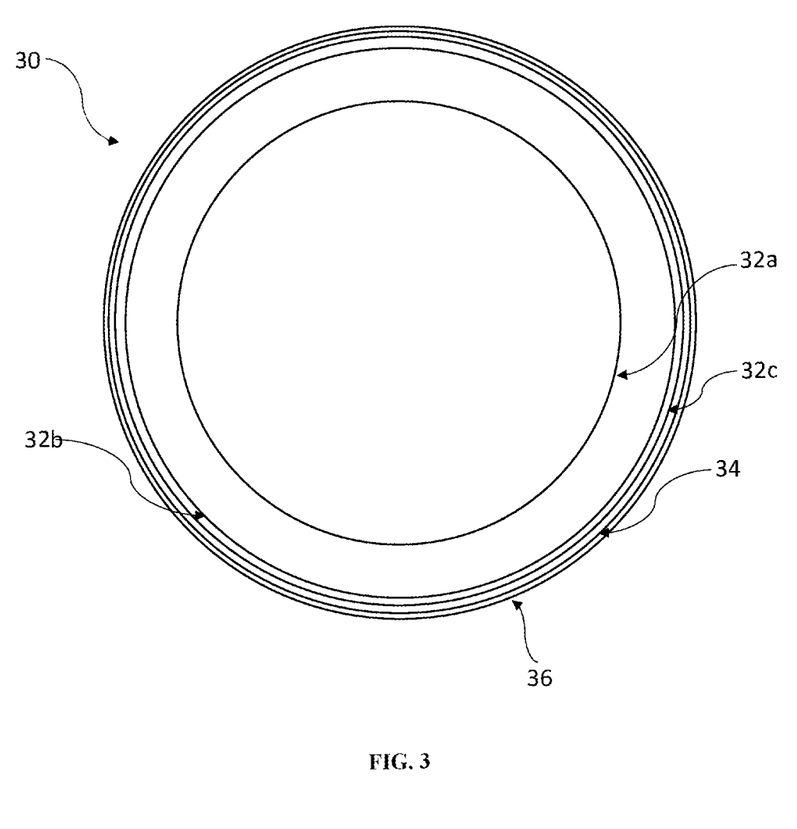
FIG. 3 is a cross-sectional view of a five-piece golf ball in accordance with an embodiment of the present disclosure.

Referring to FIG. 1, in one version, a three-piece golf ball 10 can be made in accordance with this invention. The ball 10 contains a core 12, a cover 16, and a casing layer 14 disposed between the core 12 and the cover 16. Referring to FIG. 2, in one version, a four-piece golf ball 20 can be made in accordance with this invention. The ball 20 contains a center 22, an outer core layer 24, a cover 28, and a casing layer 26 disposed between the outer core layer 24 and the cover 28. Referring to FIG. 3, in another version, a five-piece golf ball 30 contains a core 32 including a center 32a, an outer core layer 32c, and an inner core layer 32b disposed between the center 32a and the outer core layer 32c, a cover 36, and a casing layer 34 disposed between the core 32 and the cover 36. In any of these embodiments, the casing layer 14, 26, and 34 may be considered to be or referred to as an intermediate layer, mantle layer, or inner cover layer, or any other layer disposed between the core assemblage and the outer cover of the ball. In any of these embodiments, the cover 16, 28, or 36 may be formed from a cover composition of the present disclosure. Similarly, in any of these embodiments, the casing layer 14, 26, or 34 may be formed from a casing composition of the present disclosure.

While the casing and cover compositions discussed above are suitable for use in golf ball casing and cover layers, respectively, it is also contemplated that the casing and cover compositions formed in accordance with the present disclosure may be used to form one or more other layers of any of the one, two, three, four, or five, or more-piece (layered) balls described above. That is, any of the core layers, intermediate layers, and/or cover layers may be formed from the casing or cover compositions of this disclosure provided that at least one layer formed from a casing composition and one layer formed from a cover composition are adjacent to each other. In some embodiments, a layer formed from the casing composition of the present disclosure can be disposed between two layers formed from cover compositions of the present disclosure. For example, in an embodiment of a four-piece golf ball having a center, an outer core layer, a cover, and a casing layer disposed between the outer core layer and the cover, the casing layer may be formed from a casing composition of this disclosure and the outer core layer and/or the cover may be formed from a cover composition in accordance with the present disclosure. In other embodiments, a layer formed from a cover composition of the present disclosure can be disposed between two layers formed from casing compositions of the present disclosure. For example, in another embodiment of a four-piece golf ball having a center, an outer core layer, a cover, and a casing layer disposed between the outer core layer and the cover, the casing layer may be formed from a cover composition of this disclosure and the outer core layer and/or the cover may be formed from a casing composition in accordance with the present disclosure. When two or more layers are composed of a casing composition or a cover composition of the present disclosure, the composition of such layers may be the same or different. Similar to when casing and cover compositions of the present disclosure are used in the casing and cover layers of the present disclosure, using the casing and cover compositions of the present disclosure in other adjacent layers of a golf ball promotes adhesion between such layers and increases the durability of a golf ball made with such layers.

Golf balls made in accordance with this invention can be of any size, although the USGA requires that golf balls used in competition have a diameter of at least 1.68 inches. In accordance with the present invention, the weight, diameter, and thickness of the core and cover layers may be adjusted, as needed, so the ball meets USGA specifications of a maximum weight of 1.62 ounces and a minimum diameter of at least 1.68 inches. There is no upper limit so many golf balls have an overall diameter falling within the range of about 1.68 to about 1.80 inches. In this regard, golf balls made in accordance with this invention have a diameter in the range of about 1.68 to about 1.80 inches. In another embodiment, the golf ball diameter is about 1.68 to 1.74 inches. In another embodiment, the golf ball diameter is about 1.68 to 1.70 inches. For play outside of United States Golf Association (USGA) rules, the golf balls can be of a smaller size. In one embodiment, golf balls made in accordance with this invention have a diameter in the range of about 1.68 inches or less, e.g., 1.55 inches to about 1.68 inches.

The core of a golf ball formed in accordance with the present disclosure may be a single-layer core including a solid sphere or a multi-layer core including a center and at least one core layer disposed thereon. Core components may be formed from a rubber formulation. In one embodiment, the rubber formulation includes a base rubber in an amount of about 5 percent to 100 percent by weight based on the total weight of the formulation. In one embodiment, the base rubber is included in the rubber formulation in an amount within a range having a lower limit of about 5 percent or 10 percent or 20 percent or 30 percent or 40 percent or 50 percent and an upper limit of about 55 percent or 60 percent or 70 percent or 80 percent or 90 percent or 95 percent or 100 percent. For example, the base rubber may be present in the rubber formulation in an amount of about 40 percent to about 95 percent by weight based on the total weight of the formulation. In one embodiment, the rubber formulation includes about 55 percent to about 95 percent base rubber based on the total weight of the formulation.

The base rubber may be polybutadiene, polyisoprene, ethylene propylene rubber, ethylene-propylene-diene rubber, styrene-butadiene rubber, styrenic block copolymer rubbers, polyalkenamers such as, for example, polyoctenamer, butyl rubber, halobutyl rubber, polystyrene elastomers, polyethylene elastomers, polyurethane elastomers, polyurea elastomers, metallocene-catalyzed elastomers and plastomers, copolymers of isobutylene and p-alkylstyrene, halogenated copolymers of isobutylene and p-alkylstyrene, copolymers of butadiene with acrylonitrile, polychloroprene, alkyl acrylate rubber, chlorinated isoprene rubber, acrylonitrile chlorinated isoprene rubber, and blends of two or more thereof. In one embodiment, the rubber formulation includes polybutadiene rubber, butyl rubber, or a blend thereof as the base rubber.

The rubber formulations further include a reactive cross-linking co-agent. Suitable co-agents include, but are not limited to, metal salts of unsaturated carboxylic acids having from 3 to 8 carbon atoms; unsaturated vinyl compounds and polyfunctional monomers (e.g., trimethylolpropane trimethacrylate); phenylene bismaleimide; and combinations thereof. In one embodiment, the co-agent is one or more metal salts of acrylates, diacrylates, methacrylates, and dimethacrylates, wherein the metal is selected from magnesium, calcium, zinc, aluminum, lithium, and nickel. In another embodiment, the co-agent includes one or more zinc salts of acrylates, diacrylates, methacrylates, and dimethacrylates. For example, the co-agent may be zinc diacrylate (ZDA). In another embodiment, the co-agent may be zinc dimethacrylate (ZDMA).

The co-agent may be included in the rubber formulation in varying amounts depending on the specific core component for which the rubber formulation is intended. In one embodiment, the amount of co-agent used in the rubber formulations increases for each outer component of the core assemblage. In other words, the co-agent in the rubber formulation for the center is included in a first amount and the co-agent in the rubber formulation for the outer core layer is included in a second amount. The second amount may be more than the first amount. In this aspect, the first amount may be about 25 percent to about 90 percent of the second amount. For example, the first amount may be about 40 percent to about 80 percent of the second amount. In one embodiment, the first amount is about 60 percent to about 75 percent of the second amount.

Radical scavengers such as a halogenated organosulfur, organic disulfide, or inorganic disulfide compounds may also be added to the rubber formulation. In one embodiment, a halogenated organosulfur compound included in the rubber formulation includes, but is not limited to, pentachlorothiophenol (PCTP) and salts of PCTP such as zinc pentachlorothiophenol (ZnPCTP). In another embodiment, ditolyl disulfide, diphenyl disulfide, dixylyl disulfide, 2-nitroresorcinol, and combinations thereof are added to the rubber formulation.

The rubber formulation may be cured using conventional curing processes. Non-limiting examples of curing processes suitable for use in accordance with the present invention include peroxide-curing, sulfur-curing, high-energy radiation, and combinations thereof. In one embodiment, the rubber formulation includes a free-radical initiator selected from organic peroxides, high-energy radiation sources capable of generating free-radicals, and combinations thereof. Suitable organic peroxides include, but are not limited to, dicumyl peroxide; n-butyl-4,4-di(t-butylperoxy) valerate; 1,1-di(t-butylperoxy)3,3,5-trimethylcyclohexane; 2,5-dimethyl-2,5-di(t-butylperoxy) hexane; di-t-butyl peroxide; di-t-amyl peroxide; t-butyl peroxide; t-butyl cumyl peroxide; 2,5-dimethyl-2,5-di(t-butylperoxy)hexyne-3; di(2-t-butyl-peroxyisopropyl)benzene; dilauroyl peroxide; dibenzoyl peroxide; t-butyl hydroperoxide; and combinations thereof. In a particular embodiment, the free radical initiator is dicumyl peroxide, including, but not limited to Perkadox® BC, commercially available from Akzo Nobel. Peroxide free-radical initiators may be present in the rubber formulation in an amount of at least 0.05 parts by weight per 100 parts of the total rubber, or an amount within the range having a lower limit of 0.05 parts or 0.1 parts or 1 part or 1.25 parts or 1.5 parts or 2.5 parts or 5 parts by weight per 100 parts of the total rubbers, and an upper limit of 2.5 parts or 3 parts or 5 parts or 6 parts or 10 parts or 15 parts by weight per 100 parts of the total rubber. Concentrations are in parts per hundred (phr) unless otherwise indicated. As used herein, the term, "parts per hundred," also known as "phr" or "pph" is defined as the number of parts by weight of a particular component present in a mixture, relative to 100 parts by weight of the polymer component. Mathematically, this can be expressed as the weight of an ingredient divided by the total weight of the polymer, multiplied by a factor of 100.

The core diameter may range from about 1.50 inches to about 1.60 inches. In one embodiment, the core has a diameter of about 1.52 inches to about 1.58 inches. In another embodiment, the core diameter ranges from about 1.54 inches to about 1.56 inches.

When a cover layer of a golf ball formed in accordance with the present disclosure is not formed of a cover composition, such layer(s) may be formed from a variety of materials including any of the base polymers discussed above in the context of the cover composition, for example, polyurethanes; polyureas; copolymers, blends and hybrids of polyurethane and polyurea; olefin-based copolymer ionomer resins; polyethylene, including, for example, low density polyethylene, linear low density polyethylene, and high density polyethylene; polypropylene; rubber-toughened olefin polymers; acid copolymers, for example, poly(meth) acrylic acid, which do not become part of an ionomeric copolymer; plastomers; flexomers; styrene/butadiene/styrene block copolymers; styrene/ethylene-butylene/styrene block copolymers; dynamically vulcanized elastomers; copolymers of ethylene and vinyl acetates; copolymers of ethylene and methyl acrylates; polyvinyl chloride resins; polyamides, poly(amide-ester) elastomers, and graft copolymers of ionomer and; crosslinked trans-polyisoprene and blends thereof; polyester-based thermoplastic elastomers; polyurethane-based thermoplastic elastomers; synthetic or natural vulcanized rubber; and combinations thereof.

Likewise, when layers outside of the core are not formed of a casing or cover composition of the present disclosure, conventional and non-conventional materials may be used for forming such layer(s) of the ball including, for instance, any of the ionomer resins discussed above, highly neutralized polymers, polybutadiene, butyl rubber, and other rubber-based formulations, and the like.

Any of the layers of a golf ball formed in accordance with the present disclosure may include a variety of fillers and additives to impart specific properties to the ball. For example, relatively heavy-weight and light-weight metal fillers such as, particulate; powders; flakes; and fibers of copper, steel, brass, tungsten, titanium, aluminum, magnesium, molybdenum, cobalt, nickel, iron, lead, tin, zinc, barium, bismuth, bronze, silver, gold, and platinum, and alloys and combinations thereof may be used to adjust the specific gravity of the ball. Other additives and fillers include but are not limited to optical brighteners, fluorescent agents, whitening agents, UV absorbers, light stabilizers, surfactants, processing aids, antioxidants, stabilizers, softening agents, chemical blowing and foaming agents, defoaming agents, fragrance components, plasticizers, wetting agents, impact modifiers, antiozonants, titanium dioxide, clay, mica, talc, glass flakes, milled glass, coloring agents such as pigments, pigment dispersions, and dyes, and mixtures thereof.

The outermost cover layer preferably has a material hardness of 85 Shore C or less. The thickness of the outermost cover layer is preferably within a range having a lower limit of 0.010 or 0.015 or 0.025 inches and an upper limit of 0.035 or 0.040 or 0.055 or 0.080 inches. Methods for measuring the hardness of the layers in the golf ball are described in further detail herein. When included, the inner cover layer preferably has a material hardness within a range having a lower limit of 70 or 75 or 80 or 82 Shore C and an upper limit of 85 or 86 or 90 or 92 Shore C. The thickness of the intermediate layer is preferably within a range having a lower limit of 0.010 or 0.015 or 0.020 or 0.030 inches and an upper limit of 0.035 or 0.045 or 0.080 or 0.120 inches.

In one embodiment, the golf balls made in accordance with the present disclosure include a core as described herein, a casing layer disposed on the core formed from a casing composition of the present disclosure, and a cover formed from a cover composition of the present disclosure, and the cover has a hardness that is less than that of the casing layer. For example, the casing layer disposed between the core and the cover may have a hardness of greater than about 60 Shore D and the cover may have a hardness of less than about 60 Shore D.

In some aspects, when the layer(s) disposed between the core and the cover is intended to be the hardest point in the ball, e.g., about 50 Shore D to about 75 Shore D, the cover material may have a hardness of about 20 Shore D or greater, preferably about 25 Shore D or greater, and more preferably about 30 Shore D or greater, as measured on the slab. In another embodiment, the cover itself has a hardness of about 30 Shore D or greater. In particular, the cover may be from about 30 Shore D to about 70 Shore D. In one embodiment, the cover has a hardness of about 40 Shore D to about 65 Shore D, and in another embodiment, about 40 Shore to about 55 Shore D. In another aspect of the invention, the cover has a hardness less than about 45 Shore D, preferably less than about 40 Shore D, and more preferably about 25 Shore D to about 40 Shore D. In one embodiment, the cover has a hardness from about 30 Shore D to about 40 Shore D.

In an alternative embodiment, the casing layer is formed of a cover composition of the present disclosure and the cover is formed of a casing composition. In this alternative embodiment, the layer disposed between the core and the cover may have a hardness of less than about 60 Shore D, the cover may have a hardness of greater than about 55 Shore D, and the layer disposed between the core and the cover has a hardness that is less than the cover hardness.

When a dual cover is disposed about the core, the casing layer may have a thickness of about 0.01 inches to about 0.1 inches, about 0.015 inches to about 0.08 inches, or about 0.02 inches to about 0.05 inches. The cover may have a thickness of about 0.015 inches to about 0.055 inches, about 0.02 inches to about 0.04 inches, or about 0.025 inches to about 0.035 inches.

A golf ball formed in accordance with the present disclosure has a Coefficient of Restitution (CoR) of at least 0.750 and more preferably at least 0.800 (as measured per the test methods below). Such CoR allows players to generate greater ball velocity off the tee and achieve greater distance with their drives. At the same time, a golf ball including a cover formed from a cover composition of the present disclosure means that a player will have a more comfortable and natural feeling when striking the ball with a club. Furthermore, such golf balls have good shear durability and mechanical strength.

The shear durability of a golf ball of the present disclosure, which is manifest as the ability of a golf ball to maintain its mechanical stability and integrity upon the application of shear stress to that golf ball, is preferably comparable to or greater than a golf ball formed with a conventional casing layer and cover. As shown in Table 1 below, a "shear durability rating" is a qualitative, or relative, scale that incorporates shear mode (i.e., cut/damaged cover, abrasion type damage, and/or paint damage) and severity and weighs them accordingly to make ratings/scores averageable and errors less impactful of overall scores into a scale.

the golf balls may be soaked in water or stored at high humidity for an extended period before testing each golf ball to simulate the durability of the golf ball over an extended period or in extreme conditions.

TABLE 1

Shear Durability Rating Scale

| Rating | Cut/Damaged Cover | Abrasion Type Damage | Paint Damage |
|---|---|---|---|
| 1 | Cut or Cracked Cover with casing layer exposed | | |
| 2 | Severe cover damage with multiple groove marks and deep gouges | | |
| 3 | Moderate cover damage with more than one groove mark, missing or severely raised cover material | | |
| 4 | Moderate cover damage with one larger or several smaller groove mark, raised cover material | Severe abrasion damage, quarter sized are of planed off frets with noticeably altered dimples | |
| 5 | Slight cover damage of one or two groove marks with cover that is cut but not raised or one or two very small, raised pieces | Moderate to severe abrasion with multiple groove marks of removed fret areas, slightly noticeable dimple changes | |
| 6 | Very slight cover damage with one small area of cut cover, but not raised. Sand impregnation | Moderate abrasion damage. Frets are planed off in small dime sized area or one larger (3-4 dimples long) groove mark | Severe paint failure with missing paint on a quarter sized area or greater |
| 7 | | Abrasion of a dime sized area with no major alteration of fret areas | More severe paint damage with missing paint on two or more groove marks |
| 8 | | Minor scratches and abrasion of paint and possible cover abrasion | Moderate paint damage. One to two longer (3-4 dimples long) groove marks with interrupted paint or one groove mark with missing paint only |
| 9 | | | Slight paint damage with only one larger or several smaller groove mark of interrupted paint |
| 10 | | | No damage |

In other words, the higher the shear durability rating is, the higher the shear durability of the material. The shear durability rating above can be determined by using a mechanical golf swing machine where one or more hits are made on each of about 6 to 12 substantially identical golf balls of substantially the same composition with either a sand wedge or a pitching wedge. After a suitable calibration procedure, each experimental golf ball may be tested and assigned a rating based on visible manifestations of damage after being struck. The shear durability rating for a golf ball with a particular cover represents a numerical average of all the tested substantially identical golf balls. An alternative way to test the shear resistance of a golf ball cover involves using player testing and evaluating the results after the ball is struck multiple times with wedges and/or short irons.

Exposing a golf ball to a high moisture environment, such as by soaking the golf ball or storing the golf ball in high humidity for an extended period, may decrease the durability of a golf ball. Accordingly, in some testing procedures, In one embodiment, a golf ball formed in accordance with the present disclosure, i.e., with a cover formed of a cover composition and a casing layer formed of a casing composition as disclosed herein, has a shear durability rating of at least 6. In another embodiment, the shear durability of a golf ball formed in accordance with the present disclosure is at least 7. In still another embodiment, a golf ball formed in accordance with the present disclosure, i.e., with a cover formed of a cover composition and a casing layer formed of a casing composition as disclosed herein, has a shear durability rating of at least 8.

In some aspects, the shear durability of a golf ball formed in accordance with the present invention, i.e., with a cover formed of a cover composition and a casing layer formed of a casing composition as disclosed herein, is comparable to or better than a golf ball with a conventional casing layer and cover (holding all of the other ball components constant). In one embodiment, the shear durability of a golf ball formed in accordance with the present invention, i.e., with a cover formed of a cover composition and a casing layer formed of a casing composition as disclosed herein, is about 102 percent or more of the shear durability of a golf ball with a conventional casing layer and cover (holding all of the other ball components constant). In another embodiment, the shear durability of a golf ball formed in accordance with the present invention, i.e., with a cover formed of a cover composition and a casing layer formed of a casing composition as disclosed herein, is about 105 percent or more of the shear durability of a golf ball with a conventional casing layer and cover (holding all of the other ball components constant). In still another embodiment, the shear durability of a golf ball formed in accordance with the present invention, i.e., with a cover formed of a cover composition and a casing layer formed of a casing composition as disclosed herein, is about 110 percent or more of the shear durability of a golf ball with a conventional casing layer and cover (holding all of the other ball components constant).

The adhesion strength between a cover layer formed from a cover composition of the present disclosure and a casing layer formed of a casing composition of the present disclosure is preferably comparable to or greater than the adhesion strength of a casing and cover layer of a golf ball formed with conventional compositions. The adhesion strength between two layers of a golf ball is the force required to separate the two layers. As used herein, the adhesion strength is preferably measured using a finished golf ball having a cover layer formed from the cover compositions of the present disclosure that is disposed on a casing layer formed from the casing composition of the present disclosure. However, the adhesion strength of a golf ball of the present disclosure may be measured using subassemblies of the golf ball, such as a casing layer disposed on a golf ball core, or other layers composed of any of the compositions as disclosed herein. For example, the adhesion strength may be measured using a finished golf ball having a cover made from the casing composition and a casing layer made from the cover composition.

Skilled artisans are aware of methods to determine the adhesion strength. One commonly used test for measuring adhesion strength is the repeated ball impact test. The repeated impact test consists of subjecting the finished golf ball to impact repeatedly and visually examining the coating film for peeling from the golf ball. To make the repeated ball impact test reproducible, the test may be carried out using a pneumatic cannon or similar device to propel the balls a 125 feet per second against a rigid wall at an angle of 45 degrees relative to the wall. The ball may be impacted in this manner 100, 200, or 300 or more times depending on the desired level of testing.

When golf balls are formed with the casing and cover compositions of the present disclosure, there are preferably no cracks or crazes after about 100 hits or more. In one embodiment, the casing and cover compositions of the present disclosure prevent cracks or crazes until after about 200 hits or more. In still another embodiment, golf balls formed with the casing and cover compositions of the present disclosure do not have any cracks or crazes until after about 300 hits or more. In yet another embodiment, golf balls formed with the casing and cover compositions of the present disclosure do not have any cracks or crazes until after about 600 hits or more.

The adhesion strength of a layer of the golf ball may also be measured as the force required to pull apart two layers of the golf ball. Another common test for measuring adhesion strength is the peel test. To conduct the peel test, a strip of approximately 12 inch is cut around an equator of the golf ball, deep enough to cut through the entire layer to be tested. Next, a perpendicular cut is made across the strip and one end of the strip is peeled back just enough to make a tab of about ½ inch. The ball is then clamped into a jig by poles with the tab facing upward. The jig allows the clamped ball to freely rotate about an axis parallel to the poles. The tab is then clamped to a 201$b$. load cell of a universal testing machine. The tab is pulled away from the ball at a rate of 0.5 in./min., and the force required to pull the outer layer off of the underlying layer is recorded.

As measured using the peel test, the adhesion strength between layers of the golf ball formed from the cover and casing compositions of the present disclosure may be about 5 lb/in or greater, about 10 lb/in or greater, about 18 lb/in or greater, about 25 lb/in or greater, or about 30 lb/in or greater. In one embodiment, the adhesion strength between layers of a golf ball formed from the compositions of the present disclosure is about 5 lb/in to about 40 lb/in or about 10 lb/in to about 40 lb/in or about 10 lb/in to about 30 lb/in or about 15 lb/in to about 40 lb/in. In another embodiment, the adhesion strength between layers of a golf ball formed from the compositions of the present disclosure is about 18 lb/in to about 40 lb/in or about 18 lb/in to about 30 lb/in or about 18 lb/in to about 25 lb/in or about 22 lb/in to about 35 lb/in or about 25 lb/in to about 40 lb/in or about 30 lb/in to about 40 lb/in. In some embodiments, the adhesion strength between layers of the golf ball formed from the cover and casing compositions of the present disclosure is so great that the balls cannot be peeled in the peel test. Rather, the cover material rips or tears when the peel test is attempted. This indicates that the adhesion strength between layers formed from the cover and casing compositions of the present disclosure exceeds the tensile strength of the layer made from the cover composition.

The golf balls of the present disclosure may be formed using a variety of application techniques. For example, the golf ball layers may be formed using compression molding, flip molding, injection molding, retractable pin injection molding, reaction injection molding (RIM), liquid injection molding (LIM), casting, vacuum forming, powder coating, flow coating, spin coating, dipping, spraying, and the like. Conventionally, compression molding and injection molding are applied to thermoplastic materials, whereas RIM, liquid injection molding, and casting are employed on thermoset materials. In this aspect, cover layers may be formed over the core assemblage using any suitable technique that is associated with the material used to form the layer. For example, the casing and cover compositions of the present disclosure may be formed into one or more layers of a golf ball by conventional compression or injection molding techniques. When injection molding techniques are used, the adhesion promoter may be added to the cover composition before injection molding. The casing layer may be smoothed using surface grinding before the formation of the cover layer. Other than surface grinding, no other pretreatment of the casing layer may be necessary.

Golf balls made in accordance with the present disclosure may be subjected to finishing steps such as flash-trimming, surface treatment (such as buffing of the parting line and surface preparation via vibratory media tumble), marking, coating, and the like using techniques known in the art. In one embodiment, a white-pigmented cover may be surface-treated using a suitable method such as, for example, corona, plasma, or ultraviolet (UV) light treatment. Indicia such as trademarks, symbols, logos, letters, and the like may be printed on the cover using pad printing, ink-jet printing, dye-sublimation, or other suitable printing methods. Clear surface coatings (for example, primer and top coats), which may contain a fluorescent whitening agent, may be applied to the cover. Golf balls may also be painted with one or more paint coatings in a variety of colors. In one embodiment, white primer paint is applied first to the surface of the ball and then a white topcoat of paint may be applied over the primer.

Examples

The invention is further illustrated by the following example of a golf ball cover layer. It should be understood that the example below is for illustrative purposes only. These examples should not be construed as limiting the scope of the invention.

The cover layer of this example is formed from a cover composition in accordance with the present disclosure. The example below provides the components in the cover composition. The components of the cover composition are divided between the prepolymer and the curative blend, though it is understood that the prepolymer and curative blend form a single cover composition when mixed. Concentrations of each component are provided in weight percent based on the total weight of the cover composition. Concentrations of components are in weight percent (wt %) defined as the weight of a particular component present in the cover composition, relative to the weight of the cover composition as a whole.

The cover composition below includes a polyurethane base polymer formed from a polyurethane prepolymer and polyurethane curative blend. The polyurethane prepolymer includes a long-chain polyol, PTMEG 2000 (polytetramethylene ether glycol 2000); a blend of isocyanate compounds, Desomdur® N-3400 and Desomdur® W; an adhesion promotor, Crosslinker® CX-100. The polyurethane curative blend includes a hydroxy-terminated curing agent, diethyltoluene diamine; a pigment dispersion, Stan-Tone HCC34249 Hi-Optic Yellow Vinyl Paste Dispersion; and a catalyst, acetic acid.

TABLE 1

Cover Composition

| | Component | Concentration (wt % of total cover composition) |
|---|---|---|
| Prepolymer | Desmodur ® N-3400 | 7.59% |
| | Desmodur ® W | 17.72% |
| | PTMEG 2000 | 60.86% |
| | Crosslinker ® CX-100 | 0.125% |
| Curative Blend | Diethyltoluene Diamine | 9.62% |
| | HCC34249 Hi-Optic Yellow | 4.00% |
| | Acetic Acid | 0.075% |

Unless otherwise defined, all terms (including technical and scientific terms) used herein have the same meaning as commonly understood by one of ordinary skill in the art of this disclosure. It will be further understood that terms, such as those defined in commonly used dictionaries, should be interpreted as having a meaning that is consistent with their meaning in the context of the specification and should not be interpreted in an idealized or overly formal sense unless expressly so defined herein. Well-known functions or constructions may not be described in detail for brevity or clarity.

The terms "about" and "approximately" shall generally mean an acceptable degree of error or variation for the quantity measured given the nature or precision of the measurements. Numerical quantities given in this description are approximate unless stated otherwise, meaning that the term "about" or "approximately" can be inferred when not expressly stated.

The terminology used herein is for the purpose of describing particular embodiments only and is not intended to be limiting. As used herein, the singular forms "a", "an" and "the" are intended to include the plural forms as well (i.e., at least one of whatever the article modifies), unless the context clearly indicates otherwise.

The terms "first," "second," and the like are used to describe various features or elements, but these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the disclosure. Likewise, terms like "top" and "bottom"; "front" and "back"; and "left" and "right" are used to distinguish certain features or elements from each other, but it is expressly contemplated that a top could be a bottom, and vice versa.

The golf balls described and claimed herein are not to be limited in scope by the specific embodiments herein disclosed, since these embodiments are intended as illustrations of several aspects of the disclosure. Any equivalent embodiments are intended to be within the scope of this disclosure. Indeed, various modifications of the device in addition to those shown and described herein will become apparent to those skilled in the art from the foregoing description. Such modifications are also intended to fall within the scope of the appended claims. All patents and patent applications cited in the foregoing text are expressly incorporated herein by reference in their entirety. Any section headings herein are provided only for consistency with the suggestions of 37 C.F.R. § 1.77 or otherwise to provide organizational queues. These headings shall not limit or characterize the invention(s) set forth herein.

What is claimed is:

1. A golf ball, comprising:
   a core;
   a casing layer disposed on the core, the casing layer formed from a casing composition comprising carboxyl groups;
   a cover disposed on the casing layer and formed from a cover composition comprising nucleophile groups and a polyaziridine adhesion promoter; and
   crosslinks between the carboxyl groups of the casing layer and the nucleophile groups of the cover layer.

2. The golf ball of claim 1, wherein the nucleophile groups include hydroxyl groups, wherein the crosslinks comprise one or more of the following linkage:

and wherein R1 is a carbon chain in the adhesion promoter, R2 is a carbon chain in the cover layer, and R3 is a carbon chain in the casing layer.

3. The golf ball of claim 1, wherein the nucleophile groups include amino groups, wherein the crosslinks comprise one or more of the following linkage:

and wherein R1 is a carbon chain in the adhesion promoter, R2 is a carbon chain in the cover layer, and R3 is a carbon chain in the casing layer.

4. The golf ball of claim 1, wherein the adhesion promoter is included in the cover composition in an amount of about 0.01 percent to about 5.0 percent by weight.

5. The golf ball of claim 1, wherein the adhesion promoter comprises a difunctional polyaziridine.

6. The golf ball of claim 1, wherein the adhesion promoter comprises a trifunctional polyaziridine.

7. The golf ball of claim 1, wherein the casing composition comprises an ionomer.

8. The golf ball of claim 1, wherein the cover composition comprises a base polymer that is selected from the group consisting of polyurethanes, polyureas, and hybrids, copolymers, and blends thereof.

9. The golf ball of claim 1, wherein the cover layer comprises a catalyst.

10. The golf ball of claim 9, wherein the catalyst is an acid catalyst.

11. A golf ball, comprising:
a core;
a casing layer disposed on the core, the casing layer formed from a casing composition comprising carboxyl groups;
a cover disposed on the casing layer comprising hydroxyl and/or amino groups and formed from a prepolymer and a curative blend, wherein the prepolymer is the reaction product of an isocyanate-containing component and an adhesion promoter; and
crosslinks between the casing layer and the cover that are the reaction products of the adhesion promoter and the carboxyl groups and one or more of the hydroxyl and/or amino groups.

12. The golf ball of claim 11, wherein the adhesion promoter is included in the cover composition in an amount of about 0.01 percent to about 5.0 percent by weight.

13. The golf ball of claim 11, wherein the adhesion promoter comprises a polyaziridine.

14. The golf ball of claim 11, wherein the adhesion promoter comprises a difunctional or trifunctional polyaziridine.

15. The golf ball of claim 11, wherein the catalyst is an acid catalyst.

16. The golf ball of claim 11, wherein the cover comprises urethane linkages, urea linkages, or both.

17. A golf ball, comprising:
a core;
a casing layer disposed on the core and formed from a casing composition comprising an ionomer; and
a cover disposed on the casing layer and formed from a cover composition comprising a base polymer selected from the group consisting of polyurethanes, polyureas, polyurethane-polyurea hybrids, polyurethane-polyurea copolymers, and polyurethane-polyurea blends and an adhesion promoter; and
crosslinks between the cover and casing layer comprising one or more of the following linkages:

and wherein R1 is a carbon chain in the adhesion promoter, R2 is a carbon chain in the cover layer, and R3 is a carbon chain in the casing layer.

18. The golf ball of claim 17, wherein the base polymer is selected from the group consisting of polyurethanes, polyurethane-polyurea hybrids, polyurethane-polyurea copolymers, and polyurethane-polyurea blends, and wherein the crosslinks include one or more of the following linkage:

and wherein R1 is a carbon chain in the adhesion promoter, R2 is a carbon chain in the cover layer, and R3 is a carbon chain in the casing layer.

19. The golf ball of claim 17, wherein the base polymer is selected from the group consisting of polyurea, polyurethane-polyurea hybrids, polyurethane-polyurea copolymers, and polyurethane-polyurea blends, and wherein the crosslinks include one or more of the following linkage:

and wherein R1 is a carbon chain in the adhesion promoter, R2 is a carbon chain in the cover layer, and R3 is a carbon chain in the casing layer.

20. The golf ball of claim 17, wherein the base polymer is selected from the group consisting of polyurethane-polyurea hybrids, polyurethane-polyurea copolymers, and polyurethane-polyurea blends, and wherein the crosslinks include one or more of each of the following linkage:

and wherein R1 is a carbon chain in the adhesion promoter, R2 is a carbon chain in the cover layer, and R3 is a carbon chain in the casing layer.

* * * * *